(12) United States Patent
Fajour

(10) Patent No.: US 7,853,426 B2
(45) Date of Patent: Dec. 14, 2010

(54) DEVICE FOR AUTOMATICALLY DETERMINING A CATEGORY OF MAIL TO WHICH A MAILPIECE DELIVERED TO A FRANKING SYSTEM BELONGS

(75) Inventor: Michel Fajour, Chatillon (FR)

(73) Assignee: NEOPOST Technologies, Bagneux (FR)

( * ) Notice: Subject to any disclaimer, the term of this patent is extended or adjusted under 35 U.S.C. 154(b) by 280 days.

(21) Appl. No.: 12/127,408

(22) Filed: May 27, 2008

(65) Prior Publication Data

US 2008/0301065 A1 Dec. 4, 2008

(30) Foreign Application Priority Data

May 28, 2007 (FR) .................................. 07 55286

(51) Int. Cl.
*G01B 21/00* (2006.01)
(52) U.S. Cl. ........................... 702/155; 33/403; 33/712; 356/625; 356/634; 356/635; 702/158; 705/400
(58) Field of Classification Search .................. 33/1 R, 33/1 V, 403, 501, 549, 679.1, 700, 706, 707, 33/708, 712; 356/601, 610, 613, 625, 630, 356/634, 635, 638; 702/1, 127, 155, 156, 702/158, 159, 166, 170; 705/400, 401, 402, 705/410, 500
See application file for complete search history.

(56) References Cited

U.S. PATENT DOCUMENTS

| | | | | | |
|---|---|---|---|---|---|
| 2,623,324 | A | * | 12/1952 | La Barber ..................... 33/1 R |
| 2,630,043 | A | * | 3/1953 | Kolisch ......................... 377/11 |
| 2,688,878 | A | * | 9/1954 | Kolisch ......................... 73/865 |
| 2,708,368 | A | * | 5/1955 | Kolisch ......................... 73/865 |
| 2,727,391 | A | * | 12/1955 | Kolisch ......................... 73/865 |
| 3,436,968 | A | * | 4/1969 | Unger et al. .................. 73/433 |
| 6,138,371 | A | * | 10/2000 | Lippa et al. ................... 33/562 |
| 6,438,529 | B1 | * | 8/2002 | Thiel ............................ 705/62 |
| 7,098,410 | B2 | | 8/2006 | Galtier et al. | |
| 7,603,787 | B1 | * | 10/2009 | Butler, III ................ 33/501.45 |
| 2007/0288402 | A1 | * | 12/2007 | Collings .................... 705/407 |

FOREIGN PATENT DOCUMENTS

| | | |
|---|---|---|
| DE | 93 10 395 U1 | 11/1993 |
| DE | 43 28 579 A1 | 3/1995 |
| EP | 0 819 919 A2 | 1/1998 |
| FR | 2 370 593 A1 | 6/1978 |

* cited by examiner

*Primary Examiner*—Edward R Cosimano
(74) *Attorney, Agent, or Firm*—Sughrue Mion, PLLC

(57) ABSTRACT

A device for determining the category of mail of a mailpiece, which device comprises: an stand designed to receive said mailpiece; at least one gauge fastened to said stand and provided with a slot of predetermined length and of predetermined height, which length and which height are suitable for defining a determined maximum width and a determined maximum thickness for the mailpiece; means for automatically estimating a length of the mailpiece depending on its position on the stand, and relative to the gauge; and means for acting, on the basis of that single estimate of the length of the mailpiece, to deliver, to a franking machine, information about the category of mail to which said mailpiece belongs.

8 Claims, 4 Drawing Sheets

DEVICE FOR AUTOMATICALLY DETERMINING A CATEGORY OF MAIL TO WHICH A MAILPIECE DELIVERED TO A FRANKING SYSTEM BELONGS

FIELD OF THE INVENTION

The present invention relates to the field of mail handling. It relates in particular to a device for automatically determining a category of mail to which a mailpiece delivered to a franking system belongs.

PRIOR ART

Nowadays, prices for carrying mailpieces are based not only weight and service criteria, but also on the size (thickness, length, and width) of the mailpiece sent. Either, it is necessary to check whether the dimensions of the envelope or of the parcel are greater than thresholds ("letter", "large letter", and "packet" thresholds in the British regulations), or it is necessary to check whether the aspect ratio, i.e. the ratio between the length and the width of the envelope or of the parcel, lies between two limit values (e.g.: $1.3<R<2.5$ for the United States, and $R<\sqrt{2}$ for Germany).

In order to assign the appropriate price to each mailpiece in a non-uniform batch, a device for measuring the weight and the dimensions of each envelope is placed upstream from the franking module or "postage meter" of a mail-handling machine, in general at the feed module or "feeder" thereof, and the resulting information is transmitted to a price computer. The weight can also be measured separately by means of a weigh module placed independently in the path along which the envelopes are conveyed, e.g. between the feeder and the franking module.

An example of such a device is given in U.S. Pat. No. 7,098,410 filed in the name of the Applicant. That apparatus is entirely satisfactory. However, it is complex and costly, and thus, in practice, ill-adapted to bottom-of-range franking machines.

OBJECTS AND DEFINITION OF THE INVENTION

An object of the present invention is to propose a device designed to make it possible to measure the format (length, width, thickness) of a mailpiece in order to define the category of mail to which it belongs for franking purposes, without it being necessary to use complex or costly systems for taking that measurement. An object of the invention is also to propose a universal device that can be implemented in any country, i.e. regardless of the postal regulations that apply in that country.

The invention achieves these objects by means of a device for determining the category of mail of a mailpiece, which device comprises an stand designed to receive said mailpiece, said device further comprising:

- at least one gauge fastened to said stand and provided with a slot of predetermined length and of predetermined height, which length and which height are suitable for defining a determined maximum width and a determined maximum thickness for said mailpiece;
- means for automatically estimating a length of said mailpiece depending on its position on said stand, and relative to said at least one gauge; and
- means for acting, on the basis of that single estimate of the length of the mailpiece, to deliver, to a franking machine, information about the category of mail to which said mailpiece belongs.

Thus, the presence of a gauge on a single stand makes it possible to reduce determining the format of a mailpiece to making a single estimate of the length thereof. It is thus possible, without knowing the format, to deduce, from that estimate, the category of mail to which the mailpiece belongs, thus making it possible, as soon as its weight is known, to compute the amount of postage required for franking it.

Preferably, said stand has a longitudinal lip and a side lip against which said mailpiece is put into reference, with said gauge being fastened parallel to said side lip, and said means for estimating said length comprise a single series of presence detectors, each of which is disposed on said stand in a respective predetermined position relative to said side lip and to said at least one gauge, and delivers a state signal to a processor unit that generates said information about the category of mail.

Advantageously, the device has first and second gauges that form the two flanges of a channel-section rail disposed parallel to said side lip, which gauges define respective different determined maximum widths and thickness for the mailpiece.

Preferably, each of said presence detectors is chosen from one of the following types of sensor: optical, mechanical, and ultrasound sensors.

Advantageously, said single series of presence detectors includes both a first presence detector disposed between said referencing side lip and said first gauge, and a second presence detector disposed between said first and second gauges, the other presence detectors being disposed in positions successively increasingly remote from said second gauge. Said single series of presence detectors may be formed by a strip of light-emitting diodes.

Preferably, said processor unit is connected to said franking machine by a connector of the "plug-and-play" type.

The present invention also provides any franking machine that includes a mail category defining device as defined above.

BRIEF DESCRIPTION OF THE DRAWINGS

Other characteristics and advantages of the invention appear from the following description of particular embodiments, given by way of non-limiting example, and with reference to the accompanying drawings, in which.

DETAILED DESCRIPTION OF PREFERRED EMBODIMENTS

Figure 1:
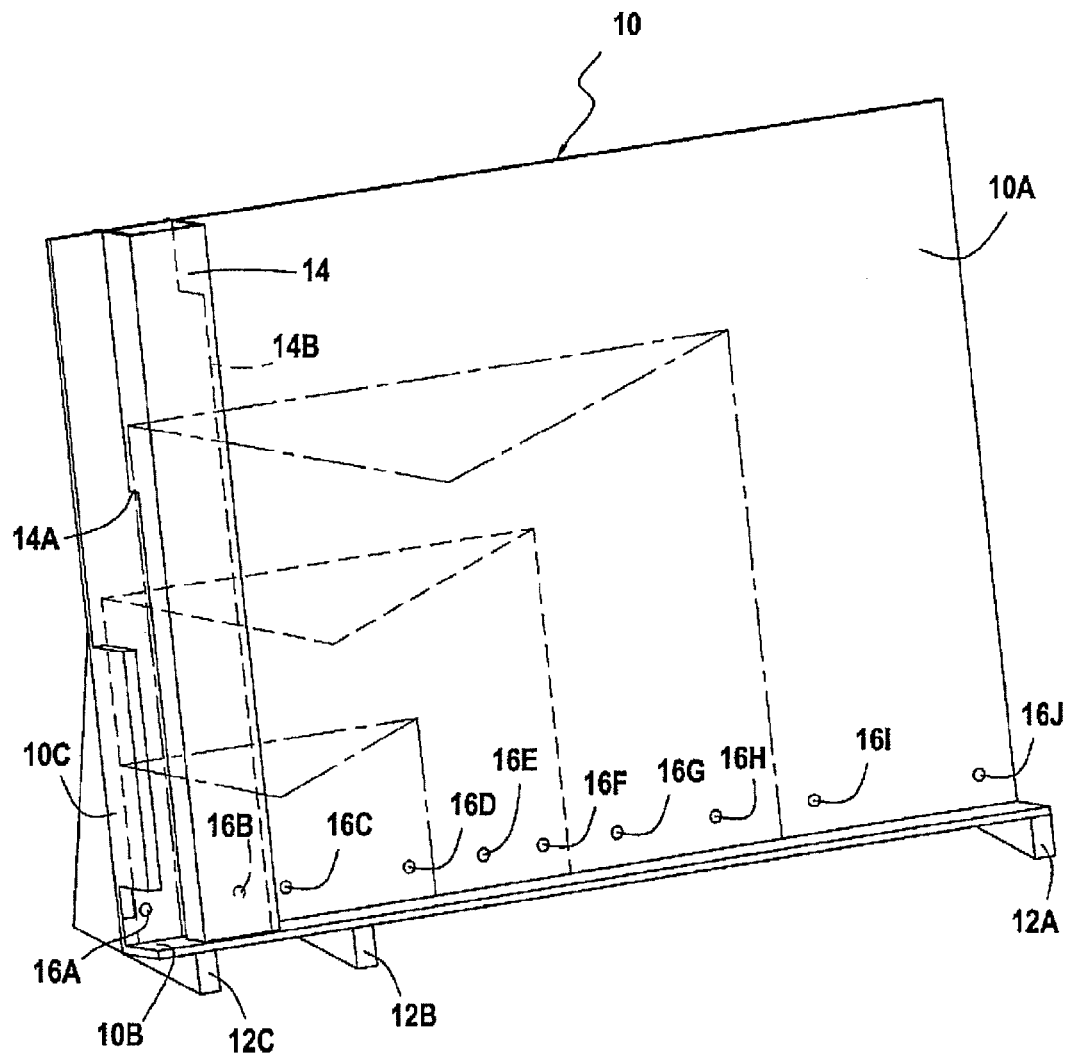
FIGS. 1 and 2 are perspective views, for various formats of mailpiece, of a device of the invention for determining the category of mail of a mailpiece.
Figure 2:
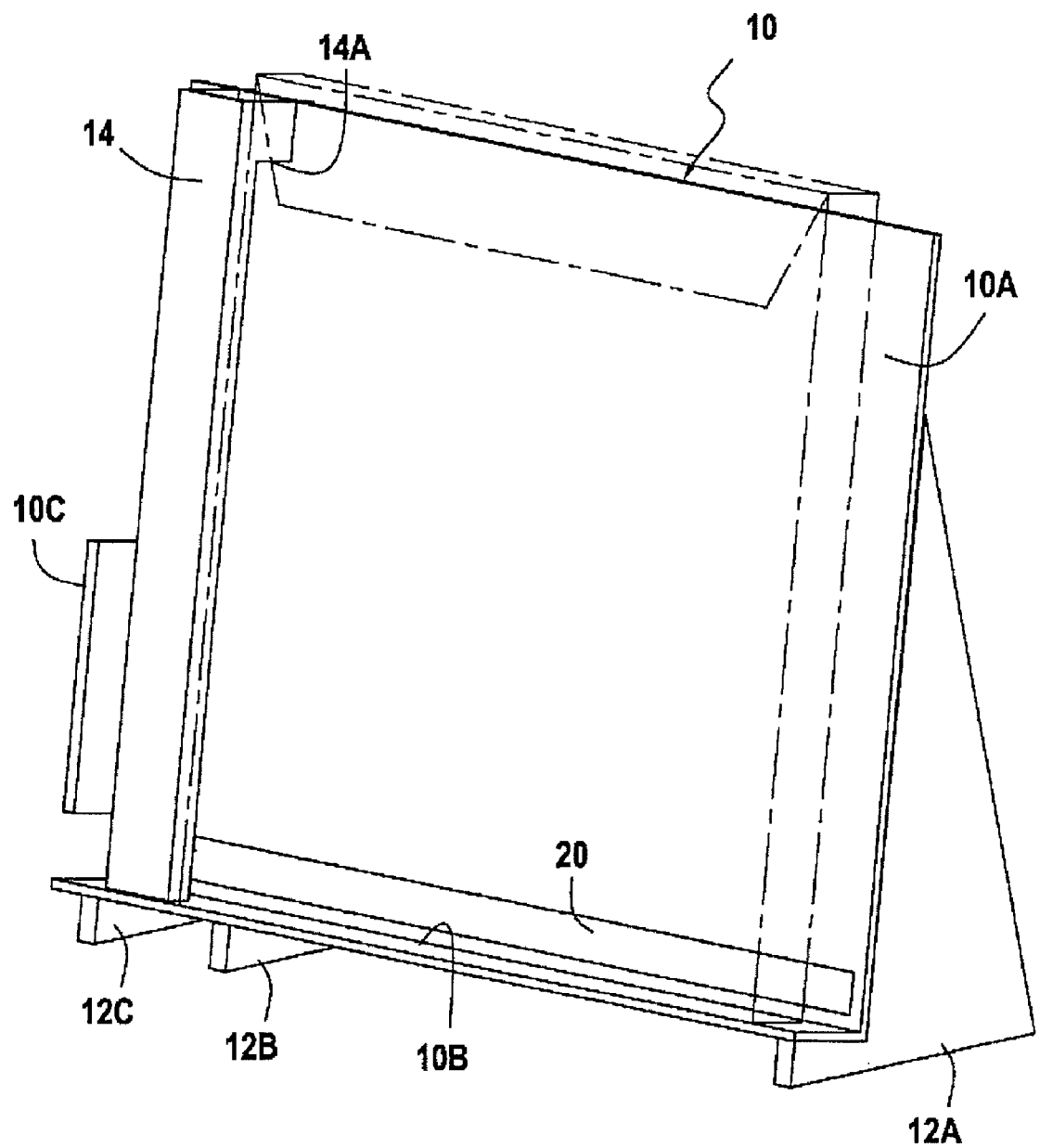

FIGS. 1 and 2 are perspective views of a device of the invention making it possible to determine the category of mail to which any mailpiece belongs. The term "mailpiece" should be understood to mean either an envelope or a parcel.

In the example shown, this device is in the form of a bookrest-shaped stand 10 standing on a one or more legs 12A, 12B, 12C. It is made up of a sloping surface 10A designed to receive and support the mailpiece and of referencing abutments formed by a longitudinal lip or ledge 10B at the base of the stand, and, on one of its two sides, by a side lip or plate 10C, the function of the two abutments being to enable the mailpiece to be jogged towards the bottom and towards the left of the stand. In the description below, references to "right" and "left" should be understood as being respectively the right and the left of an observer looking at the stand from the front.

The stand is provided with a channel-section rail 14 fastened to the sloping surface and parallel to and at a predetermined distance from the side plate 10C, each of the two flanges of the channel section constituting a gauge provided with a slot of predetermined length and of predetermined height, which length and height are suitable for defining a determined maximum width and a determined maximum thickness for the mailpiece. In the example shown, corresponding to the British (Royal Mail) postal regulations, of which the various categories of mail are given below, the left gauge has a first slot 14A of 5 millimeters (mm)×165 mm, and the right gauge has a second slot 14B of 25 mm×250 mm, making it possible to define three ranges of widths for the mailpiece (<165 mm, from 165 mm to 250 mm, and >250 mm), and two thickness thresholds (5 mm and 25 mm).

TABLE

Royal Mail definitions of categories of mail

| Categories of mail | Thickness | Size = Length × Width | Weight |
| --- | --- | --- | --- |
| letter | <5 mm | <240 mm × 165 mm | <100 g |
| large letter | <25 mm | <353 mm × 250 mm | <750 g |
| packet | >25 mm | >353 mm × 250 mm | >750 g |

Figure 3:
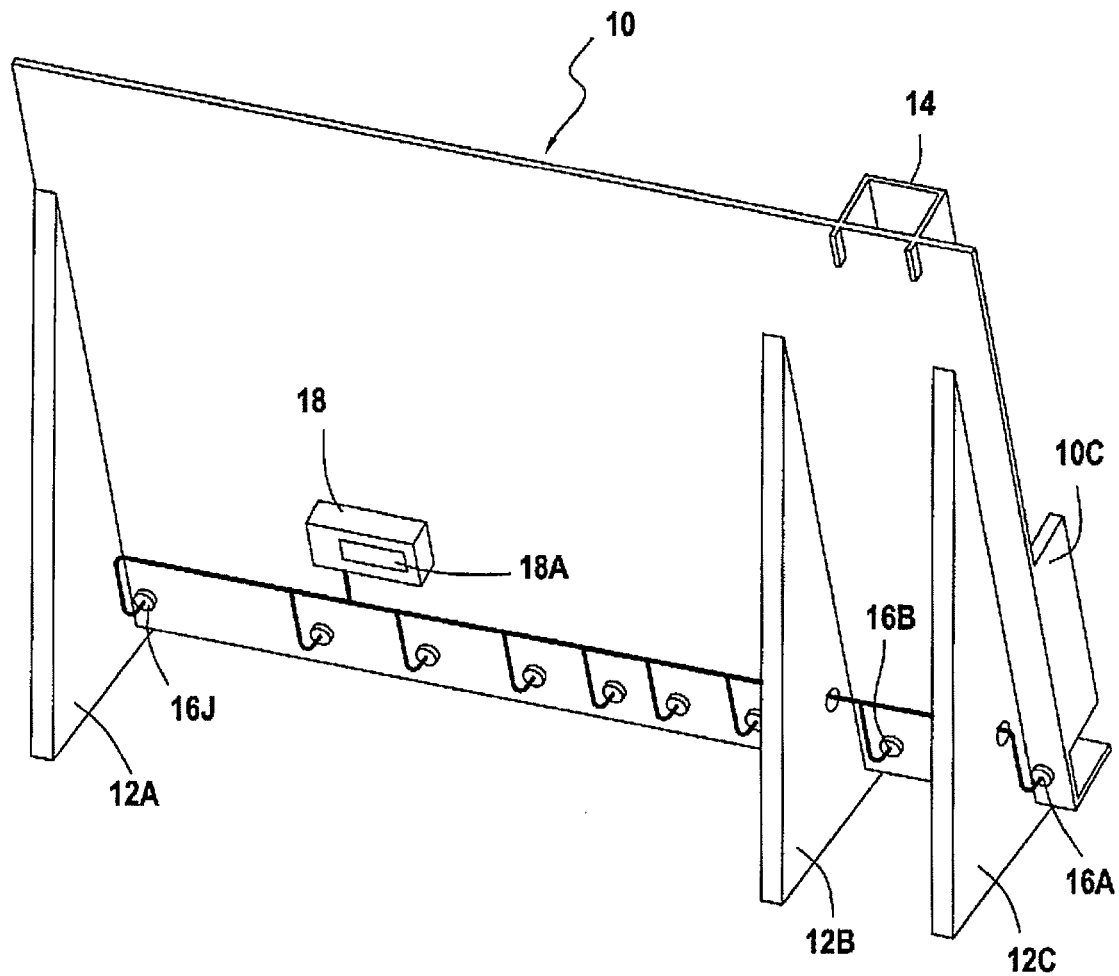
FIG. 3 is a rear view of the device of FIG. 1.

The stand is further provided with a single series of presence detectors 16A-16J, all of which are connected to a processor unit 18 (shown in the rear view of FIG. 3), itself connected via a connector 18A to the franking machine (not shown) for which the stand advantageously constitutes a peripheral of the "plug-and-play" type, the respective predetermined positions of said presence detectors being adapted so that, by detecting the presence and the position of a mailpiece on the stand, each of said detectors delivers a state signal making it possible to estimate the length of the mailpiece depending on the position of said mailpiece relative to the side plate and to one or other of the gauges. Said presence detectors can be of any type that makes it possible, by delivering state signals having two states (all or nothing, or high and low), to detect the presence of the mailpiece on the stand, such as sensors of the optical, mechanical, or ultrasound types, or of some other type.

Thus, in the example shown, which is in no way limiting, the leftmost sensor, i.e. the first sensor 16A, makes it possible to detect a mailpiece placed on the stand and extending through both of the gauges, the second sensor 16B makes it possible to detect a mailpiece passing through the right gauge only and coming into abutment against the left gauge inside the rail 14, and the third sensor 16C makes it possible to detect a mailpiece put into abutment against the right gauge.

The estimate of the length of the mailpiece is delivered by combining this state information with the state information delivered, in the example shown, by the eighth to tenth sensors, the eighth sensor 16H being positioned at a distance of 240 mm from the side plate and the ninth sensor 16I being positioned at a distance of 353 mm from said side plate, so as to make it possible to check the lengths of mailpieces of height <165 mm and of thickness <5 mm. Similarly, the tenth sensor 16J is also positioned at a distance of 353 mm, but from the left gauge, so as to make it possible to check the lengths of mailpieces of height lying in the range 165 mm to 250 mm, and of thickness <25 mm. The fourth, fifth, sixth, and seventh presence detectors, respectively 16D, 16E, 16F, and 16G, are not used in the example shown, but they are naturally used for other postal regulations that implement different formats, thereby giving the device of the invention the characteristic of being universal.

Thus, with the invention, determining the category of mail is simplified and reduced to making a single estimate of the length of the mailpiece, the estimate being delivered merely by state signals delivered by a single series of detectors, the other two parameters of the format (width and thickness) resulting from the position of the mailpiece relative to the two gauges no longer being necessary, per se, to mail category determination.

It should be noted that, in order to accentuate further said characteristic of being universal, and in order to increase the precision in the length estimate, the individual presence detectors can be replaced by a strip 20 of light-emitting diodes, as shown in FIG. 2.

Figure 4:
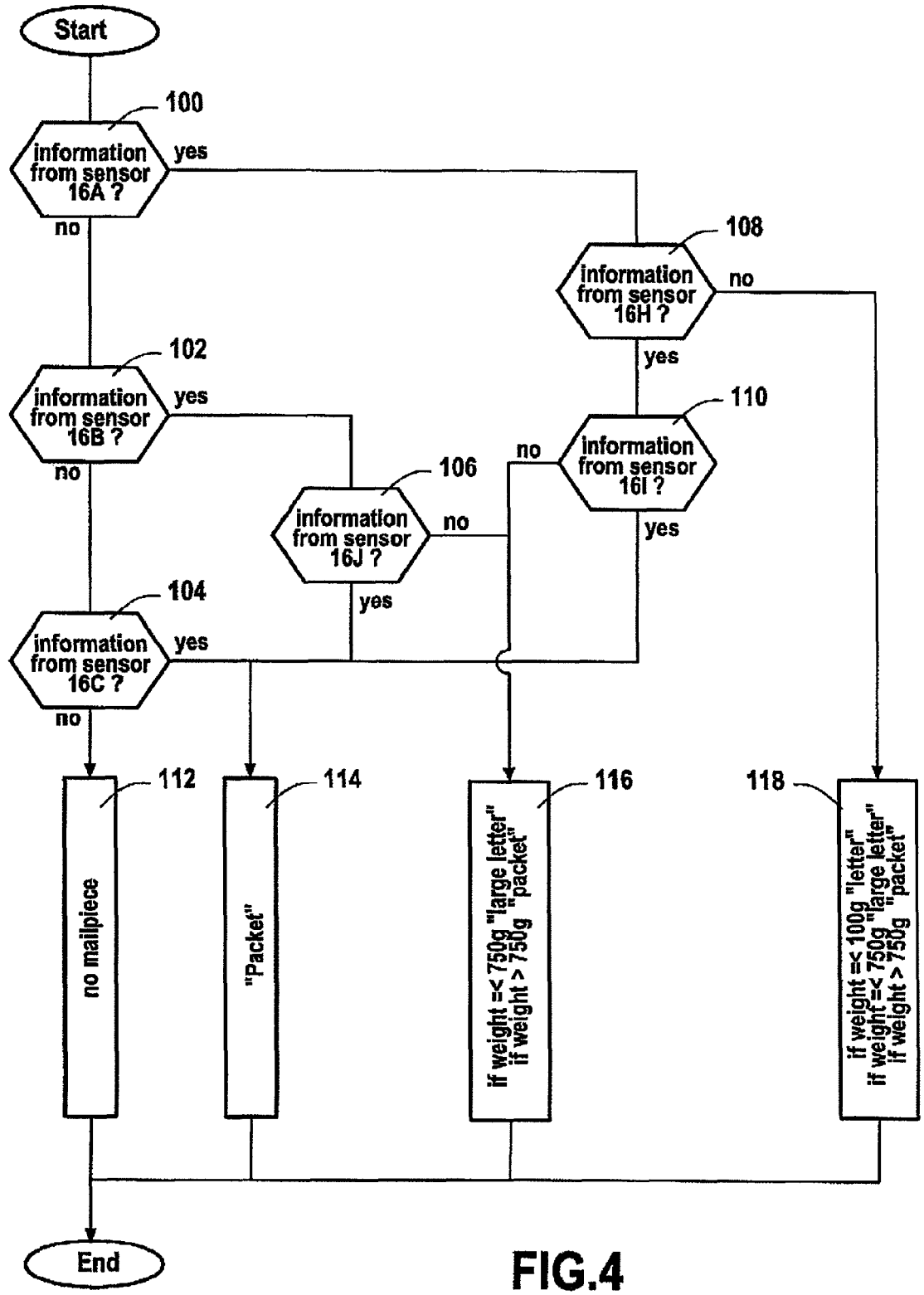
FIG. 4 is a decision tree showing the various steps making it possible to determine the category of mail to which a mailpiece handled by the device of FIGS. 1 and 2 belongs.

The device of the invention enables the category of mail to which the mailpiece belongs to be determined automatically once said mailpiece is placed and suitably jogged on the stand by the operator, the weight of the mailpiece subsequently being taken into account by scales or by a weigh platform of the franking machine then making it possible to compute the postal price. Determining the category of mail thus results merely from the respective states of the various presence detectors, once the mailpiece has been placed on the stand, as explained below with reference to the decision tree of FIG. 4.

Firstly, it should be noted that if the sensor 16A does not deliver mailpiece presence information (answer to test 100 "no"), and if the sensors 16B and 16C do not deliver such information either (answer "no" to the successive tests 102 to 104), then it is clear that there is no mailpiece on the stand, and the franking machine is so informed in a second step 112.

Conversely, if the sensors 16A and 16B still do not deliver mailpiece presence information, but the sensor 16C detects such presence (answer "yes" to test 104), that means that the mailpiece is either of thickness greater than 25 mm or of width greater than 250 mm, and it is therefore in the "packet" category, in which case the franking machine can thus be informed that said mailpiece of the "packet" type is present on the stand in a step 114. If the sensor 16A still does not deliver any mailpiece presence information (answer "no" to test 100) but if the sensor 16B detects such presence (answer "yes" to test 102) as does the sensor 16J (answer "yes" to test 106) that means that the mailpiece has a length greater than 353 mm and that it still lies within the "packet" category, of which fact the franking machine needs to be informed by a return to step 114. Conversely, if the sensor 16J does not detect the presence of the mailpiece (answer "no" to test 106), which means that the mailpiece is of length less than 353 mm, then the franking machine should be informed, in a step 116, of the presence of a mailpiece that might belong to the "packet" category or the "large letter" category, depending respectively on whether or not the weight determined by the machine is greater than 750 grams (g).

If the sensor 16A delivers mailpiece presence information (answer "yes" to test 100), and if the sensors 16H and 16I do likewise (answer "yes" to the successive tests 108 and 110), then that means that the mailpiece is of length greater then 353 mm and that the franking machine can be informed of the presence of a "packet" mailpiece on the stand by a return to the step 114. If the sensors 16A and 16H deliver said presence information (answer "yes" to the successive tests 100 and 108), but if the sensor 16J does not do likewise (answer "no"

to test 110), then, because the length of the mailpiece is less than 353 mm, the franking machine should, by a return to step 116, be informed of the presence of a mailpiece that might belong to the "packet" category or to the "large letter" category depending respectively on whether or not the weight determined by said machine is greater than 750 g. Finally, if the sensor 16A still delivers mailpiece presence information (answer "yes" to test 100) but if the sensor 16H does not do likewise (answer "no" to test 108), thereby indicating that a mailpiece of length less than 250 mm is present, then, depending on whether the weight determined by the franking machine for that mailpiece is less than 100 g, or indeed, if it is greater than 100 g, whether it is less than or greater than 750 g, then, in the step 118, said mailpiece should be assigned respectively to the "letter" category, to the "large letter" category, or to the "packet" category.

Thus, with the invention, the category of mail is obtained very simply without using complex and costly systems. It should be noted that, although the device is presented in a substantially vertical position, it is clear that it can be implemented in a horizontal position and then constitute the bed of a feeder for feeding mailpieces into a franking machine. In addition, the invention makes it possible to adapt simply to accommodate all of the applicable postal regulations by providing both different gauges and different locations for the presence detectors.

What is claimed is:

1. A device for determining the category of mail of a mailpiece, which device comprises a stand designed to receive said mailpiece, said device further comprising:
   at least one gauge fastened to said stand and provided with a slot of predetermined length and of predetermined height, which length and which height are suitable for defining a determined maximum width and a determined maximum thickness for said mailpiece;
   means for automatically estimating a length of said mailpiece depending on its position on said stand, and relative to said at least one gauge; and
   means for acting, on the basis of that single estimate of the length of the mailpiece, to deliver, to a franking machine, information about the category of mail to which said mailpiece belongs.

2. A device according to claim 1, wherein said stand has a longitudinal lip and a side lip against which said mailpiece is put into reference, with said gauge being fastened parallel to said side lip, and said means for estimating said length comprise a single series of presence detectors, each of which is disposed on said stand in a respective predetermined position relative to said side lip and to said at least one gauge, and delivers a state signal to a processor unit that generates said information about the category of mail.

3. A device according to claim 2, wherein said processor unit is connected to said franking machine by a connector of the "plug-and-play" type.

4. A device according to claim 2, wherein each of said presence detectors is chosen from one of the following types of sensor: optical, mechanical, and ultrasound sensors.

5. A device according to claim 4, wherein said single series of presence detectors is formed by a strip of light-emitting diodes.

6. A device according to claim 2, having first and second gauges that form the two flanges of a channel-section rail disposed parallel to said side lip, which gauges define respective different determined maximum widths and thickness for the mailpiece.

7. A device according to claim 6, wherein said single series of presence detectors includes both a first presence detector disposed between said referencing side lip and said first gauge, and a second presence detector disposed between said first and second gauges, the other presence detectors being disposed in positions successively increasingly remote from said second gauge.

8. A franking machine including a device for determining category of mail of a mailpiece, which device comprises:
   a stand designed to receive said mailpiece;
   at least one gauge fastened to said stand and provided with a slot of predetermined length and of predetermined height, which length and which height are suitable for defining a determined maximum width and a determined maximum thickness for said mailpiece;
   means for automatically estimating a length of said mailpiece depending on its position on said stand, and relative to said at least one gauge; and
   means for acting, on the basis of that single estimate of the length of the mailpiece, to deliver, to a franking machine, information about the category of mail to which said mailpiece belongs.

* * * * *